Oct. 21, 1958     C. E. THORP ET AL     2,857,410
METHOD OF PRODUCING OZONIDES OF UNSATURATED FATTY ACIDS
Filed Sept. 28, 1956
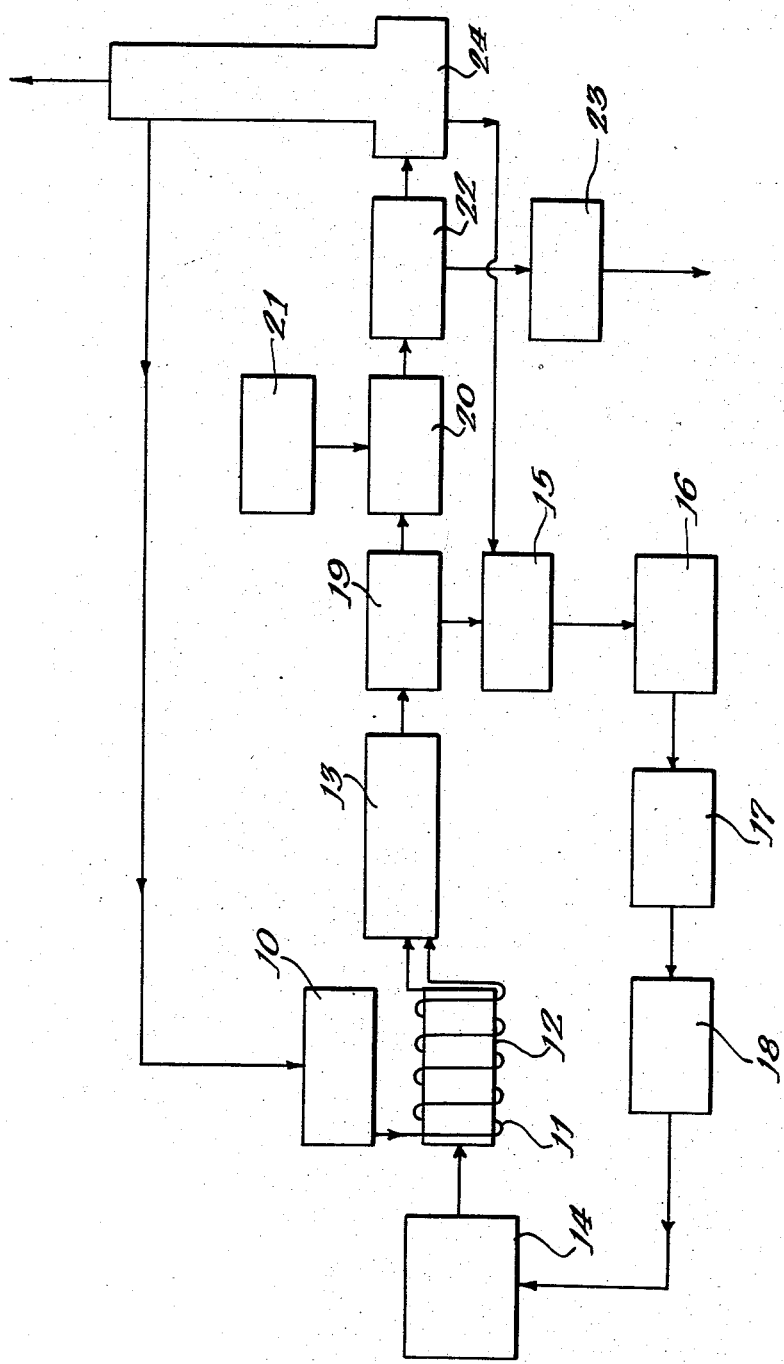
Inventors:
Clark E. Thorp
Allan J. Gaynor
By: [signature]
Attorney

United States Patent Office 2,857,410
Patented Oct. 21, 1958

2,857,410
METHOD OF PRODUCING OZONIDES OF UNSATURATED FATTY ACIDS

Clark E. Thorp, Arlington Heights, and Allan J. Gaynor, Skokie, Ill., assignors, by mesne assignments, to The Cudahy Packing Company, a corporation of Maine Application September 28, 1956, Serial No. 612,725

20 Claims. (Cl. 260—406)

Our invention relates to the production of ozonides from unsaturated fatty acids and its general object is to provide a method for such production which is more efficient and economical than the methods which have heretofore been commercially employed for this purpose.

An important commercial use of our method is in the production from oleic acid of oleic ozonides from which azelaic and pelargonic acids may be derived. However, the invention may also be used for the formation of organic oxonides from fatty acids in general. Thus, it can be applied to the production of such ozonides from naturally-occurring fatty acids of from 10 to 24 carbons chain length derived from natural fats, oils and waxes, or from derivatives and compounds of these acids, such as their esters, nitriles, etc.

An important object of the invention is to provide such a method in which the unsaturated fatty acids, or their derivatives or compounds, and ozone are reacted in vapor phase and at subatmospheric pressure. In this manner improved efficiency and greater yields of organic ozonides are obtained, as compared with the methods heretofore used.

Another of our objects is to provide a method for the purpose above stated in which no catalysts are required to promote the reaction.

A further object of the invention is to provide a method of this character in which the ozone needed for the reaction is utilized more fully than in other methods used for the production of such ozonides.

A still further object of the invention is to provide a method for the purpose stated in which the ozonizer, which is used to produce the ozone used in the reaction, may be so integrated with the other apparatus employed that less structure and fewer processing steps are necessary than in other comparable processes, thus lowering the capital investment required and the cost of operation in the practice of the method.

While not necessarily limited thereto, the invention has an important commercial use in increasing the financial return to packing plants from tallow, which is one of their major by-products. Tallow is a good source of oleic acid, which, however, often is so plentiful that its market price is too low to permit its marketing, as such, at much, if any, profit. Therefore, in many cases a better return can be obtained by converting the oleic acid into azelaic and pelargonic acids which normally command sufficiently high prices to produce a better profit to the packer than if the oleic acid were sold as an end product. Thus, by improving efficiency and lowering the cost of producing ozonides of the oleic acid from which the azelaic and pelargonic acids are derived, our invention is potentially of very substantial value to the packing industry.

The above and other objects and advantages of the invention will be apparent from the following description thereof, taken in connection with the accompanying block diagram and flow sheet illustrating the steps of our method and, in general, the units of an apparatus by which it may be practiced.

As thus illustrated, the method of our invention may be practiced in a manner which will now be described.

Oleic acid of commercial purity, having, for example, an iodine value of 86–90 and titer of 2–6° C., is contained in a supply tank 10, from which it is conducted under pressure to a coil 11 disposed around an ozonizer 12 which activates oxygen supplied thereto.

It is commonly known that ozonizers generate a great amount of heat in operation, and that, for continued operation thereof, some means must be provided for cooling the ozonizer. Also, in accordance with our invention, the oleic acid must be heated, in the absence of oxygen and under reduced pressure, so as to keep it from boiling and thus degrading and so that it will vaporize when introduced into a vapor phase reactor. Thus, the arrangement shown allows these two necessary functions to complement each other, by having the oleic acid directed through the coil 11 to cool the ozonizer 12 and at the same time to be heated by the ozonizer prior to its introduction into a vapor phase reactor 13. If the heat transferred to the oleic acid as it is conducted through the coil 11 is not great enough to raise its temperature to the point desired, additional heating means (not shown) may be provided in the circuit.

We prefer to use commercial oxygen of a purity of approximately 99.5% in our process. While air contains a sufficient amount of oxygen to be ozonized, a much larger and more intricate ozonizer would be needed if the oxygen were derived from this source, and it is accordingly more economical to use commercial oxygen and a smaller ozonizer than to use air and a more costly ozonizer. The oxygen is contained in a tank 14 from which it is conducted to the ozonizer 12.

The ozonizers in common use create ozone by electronic discharge. It is now known that the production of ozone by electronic discharge is preceded by the formation of activated oxygen which, in the atomic state, has a life of only a few milliseconds. However, by virtue of the ease with which the apparatus necessary to practice this method may be integrated, it is possible to couple the ozonizer 12 closely enough to the vapor phase reactor 13 to utilize such of this short-lived activated oxygen as is formed in the ozonizer as well as that which is produced by decomposition of ozone in the reactor.

The ozone and the heated oleic acid are introduced simultaneously and continuously into the vapor phase reactor 13. The amounts of oleic acid and ozone are metered, so that a proper amount of each is introduced into the heated reactor.

The heated oleic acid, upon being introduced into said reactor, is caused to vaporize by the reduced pressure in the presence of ozone and activated oxygen, the reaction causing the formation of fog or smoke which contains a portion of the reacted oleic acid. The exact mechanism of the ozonization is not thoroughly established; however, it has been proved in practice that the condensate collected from the reaction and certain paricles in the fog or smoke formed thereby form oleic ozonides from which azelaic and pelargonic acid may be derived.

In terms of weight, the ratio of oleic acid to ozone introduced into the reactor 13 theoretically could be as low as 5.88 to 1, since one molecule of oleic acid is 5.88 times as heavy as a molecule of ozone. However, any amount of oleic acid can be introduced into the reactor 13, so long as the ratio is 5.88 to 1 or greater, and complete ozone utilization will occur, since the additional acid acts as a diluent, and the azelaic yields from the resultant ozonides are not affected by the additional oleic acid. Complete utilization of the ozone is indicated by the fact that the effluent gas removed from the reactor 13 does not liberate iodine from a potassium iodide solution. In practice it has been found preferable to introduce a greater amount of oleic acid into the reactor 13 than will be actually used, since the excess oleic acid which will remain unreacted in the reactor 13 acts to dilute the ozonides formed, decreasing their viscosity and making them easier to transport.

The pressure maintained in the vapor phase reactor 13 will, of course, determine the temperature to which the oleic acid must be heated before introduction thereinto. The vapor pressure of oleic acid at a given temperature is known to those skilled in the art and, once the pressure in the reactor is determined, it is a simple matter to determine the temperature to which the oleic acid must be heated in order that it will vaporize when introduced therein.

Thus it is known that the vapor pressure of oleic acid varies from that equal to 1 millimeter of mercury, when the temperature thereof is 176.5° C., to that equal to 760 millimeters of mercury when the temperature thereof is 360° C. Since a pressure of 760 millimeters of mercury constitutes atmospheric pressure, any reaction of oleic acid and ozone under a pressure in excess of that would constitute a spray reaction, rather than a vapor phase reaction.

By experimentation it has been found that when practicing our invention extremely low pressures, i. e. those equal to 10 millimeters of mercury or less, are not desirable. This is because some difficulty is involved in maintaining them and the cost of the apparatus which would be required to maintain such low pressure is disproportionate to the cost of that apparatus necessary for maintaining more moderate pressures. The reaction temperature corresponding to a pressure of 10 mm. of mercury would be 223° C.

It has also been found that, when the pressure maintained in the vapor phase reactor 13 approaches atmospheric, great danger of explosion arises. Also, since the pressure in the reactor is a corollary of the temperature to which the oleic acid must be heated, it is desirable to maintain that pressure in the reactor which will allow the oleic acid to vaporize therein without the necessity of such oleic acid being heated to that point at which it begins to degrade. Since oleic acid tends to degrade to some extent at temperatures in excess of 300° C., the pressure maintained within the vapor phase reactor 13 should preferably not exceed the vapor pressure of oleic acid at such temperature, which is equal to 150 mm. of mercury.

The data hereinbelow set forth were derived from tests conducted using our method for the vapor phase reaction of oleic acid with ozone. Each of such tests was conducted with the pressure in the vapor phase reactor 13 and the temperature to which the oleic acid was heated prior to its introduction thereto varying from each of the other tests.

| Total Ozone (Grams) | Operating Pressure (mm. Hg) | Operating Temperature (° C.) | Theoretic Yield Azelaic Acid [1] (Grams) | Actual Yield Azelaic Acid (Grams) | Percent Yield of Theoretical |
|---|---|---|---|---|---|
| 0.584 | 6.9 | 217 | 2.295 | 2.21 | 96.3 |
| 0.584 | 25 | 245 | 2.29 | 2.098 | 91.5 |
| 0.54 | 73 | 278 | 2.12 | 1.996 | 94.2 |
| 0.54 | 95 | 290 | 2.12 | 2.00 | 94.4 |
| 58.2 | 125 | 295 | 228.1 | 204.0 | 89.4 |

[1] The theoretical yields expressed above are based upon the following formula, which describes the theoretical yield from reacting oleic acid and ozone; 5.88 units oleic acid plus 1 unit ozone equals 3.91 units azelaic acid plus 3.29 units pelargonic acid. The units in such formula mean units of weight, since as hereinbefore described one molecule of oleic acid weighs 5.88 times as much as one unit of ozone.

As the oleic acid and ozone and activated oxygen are introduced into the reactor 13, a condensate and smoke are formed, as previously stated. The condensate is collected in a condenser 19 and the smoke resulting from the reaction of the oleic acid and ozone, which contains particles of reacted oleic acid, is also coursed through the condenser 19 where the reacted oleic acid is removed therefrom. A suitable device such as a vacuum pump 15 draws the smoke through the condenser and maintains the reduced pressure in the vapor phase reactor 13.

The effluent gases removed from the condenser 19 by the vacuum pump 15 are then directed to a heat exchanger 16 which removes heat therefrom. Since such gases contain a good deal of oxygen which it is desirable to recycle, it is necessary to cool such gases before their re-introduction into the ozonizer 12. Upon leaving the heat exchanger 16, the gas is conducted to a gas scrubber 17 wherein organic vapor and organic particles contained in the oxygen are removed. Such re-conditioned oxygen is then coursed to a gas dryer 18 where the final operation of cleaning the oxygen takes place by removing therefrom the water vapor contained in such oxygen. Such reconditioned oxygen is then transferred to the tank 14.

The ozonides collected in the condenser 19 are transferred to a water extractor 20 wherein hot water from a water supply tank 21 is mixed therewith, hydrolizing the ozonides and forming azelaic and pelargonic acid.

The hydrolized ozonides are conducted from the water extractor 20 to a separator 22 in which the water soluble azelaic acid is separated from the pelargonic acid and the unreacted oleic acid, neither of which is water soluble. The azelaic acid contained in a water solution is directed from the separator 22 to an evaporator 23 which causes the water to be evaporated, leaving a crystalline form of azelaic acid, which is drawn off from the evaporator 23 to a container.

The unreacted oleic acid and the pelargonic acid are conducted to a still 24. The atmosphere in the still 24 is maintained at sub-atmospheric pressure by the vacuum pump 15. It is necessary to maintain sub-atmospheric pressure in the still 24 since fractional distillation, which is accomplished therein, of the oleic and pelargonic acid at atmospheric pressures would cause the oleic acid to degrade. The fractional distillation occurring in such still 24 separates the oleic acid from the pelargonic acid. The oleic acid resulting from such fractional distillation is recycled to the oleic acid tank 10, and the pelargonic acid produced thereby is directed to a suitable receptacle.

Since certain changes can be made in the foregoing procedures without departing from the spirit and scope of the invention, it is intended that all description of such procedures set forth hereinbefore shall be interpreted as illustrative and not in a limiting sense.

We claim:

1. A method of producing ozonides of unsaturated fatty acids by reacting such acids in the vapor phase with ozone, at a pressure in the range between that equal to 1 mm. of mercury and that equal to 760 mm. of mercury and at a corresponding temperature in the range between 176.5° C. and 360° C.

2. A method of producing ozonides of unsaturated fatty acids by reacting such acids in the vapor phase with ozone and activated oxygen, at a pressure in the range between that equal to 1 mm. of mercury and that equal to 760 mm. of mercury and at a corresponding temperature in the range between 176.5° C. and 360° C.

3. A method of producing ozonides of unsaturated fatty acids by reacting such acids in the vapor phase with ozone at subatmospheric pressure and at a temperature not exceeding 360° C.

4. A method of producing ozonides of unsaturated fatty acids by reacting such acids in the vapor phase with ozone and activated oxygen at subatmospheric pressure and at a temperature not exceeding 360° C.

5. A method of producing ozonides of oleic acid by reacting oleic acid in the vapor phase with ozone in the ratio of at least 5.88 to 1 at subatmospheric pressure and at a temperature not exceeding 360° C.

6. A method of producing ozonides of oleic acid by reacting oleic acid and ozone in the vapor phase in an area in which the pressure is maintained between an absolute pressure equal to one millimeter of mercury and an absolute pressure equal to 150 millimeters of mercury and in which a corresponding temperature between 176.5° C. and 300° C. is maintained.

7. A method of producing ozonides of unsaturated fatty acids of from 10 to 24 carbons in chain length by reacting such acids and ozone in the vapor phase in an area in which the pressure is maintained between an absolute pressure equal to one millimeter of mercury and an absolute pressure equal to 150 millimeters of mercury.

8. A method of producing ozonides of oleic acid by reacting oleic acid with ozone and activated oxygen in the vapor phase, such reaction being produced by heating oleic acid to the temperature necessary to cause it to subsequently vaporize in the presence of ozone and activated oxygen and then introducing the same and said ozone and activated oxygen into an area of subatmospheric pressure.

9. A method of producing ozonides of unsaturated fatty acids of from 10 to 24 carbons in chain length by reacting such acids in the vapor phase with ozone and activated oxygen, said reaction being produced by heating such acids to the temperature necessary to cause them to subsequently vaporize in the presence of ozone and activated oxygen and then introducing the same and said ozone and activated oxygen into an area of subatmospheric pressure.

10. A method of producing ozonides of unsaturated fatty acids by reacting such acids and ozone in the vapor phase in an area in which the absolute pressure is between one millimeter of mercury and 150 millimeters of mercury and the temperature of such acids is between 176.5° and 300° C., depending on the amount of such pressure.

11. A method of producing ozonides of oleic acid by reacting oleic acid in the vapor phase, at subatmospheric pressure and at a temperature not exceeding 360° C., with a gas comprising ozone and activated oxygen, in which the concentration of ozone is between 1% and 3% by weight.

12. A method of producing ozonides of unsaturated fatty acids of from 10 to 24 carbons in chain length by reacting such acids in the vapor phase, at subatmospheric pressure and at a temperature not exceeding 360° C., with a gas comprising ozone and activated oxygen, in which the concentration of ozone is between 1% and 3% by weight.

13. A method of producing ozonides of unsaturated fatty acids by reacting such acids in the vapor phase with ozone and activated oxygen at a pressure in the range between that equal to 1 mm. of mercury and that equal to 760 mm. of mercury and at a corresponding temperature in the range between 176.5° C. and 360° C., condensing the gases resulting from such reaction and recycling the oxygen contained in such gases.

14. A method of producing ozonides of unsaturated fatty acids by reacting such acids in the vapor phase with ozone and activated oxygen at a pressure in the range between that equal to 1 mm. of mercury and that equal to 760 mm. of mercury and at a corresponding temperature in the range between 176.5° C. and 360° C., condensing the gases resulting from such reaction and recycling the oxygen contained in such gases, the same being cooled, scrubbed and dried during such recycling.

15. A method of producing oleic ozonides by reacting oleic acid in the vapor phase with ozone and activated oxygen at a pressure in the range between that equal to 1 mm. of mercury and that equal to 760 mm. and at a corresponding temperature in the range between 176.5° C. and 360° C., condensing the gases resulting from said such reaction, recycling the oxygen contained in such gases and hydrolyzing the ozonides contained in the condensate to form a solution from which both azelaic acid and pelargonic acid are derived.

16. A method of producing oleic ozonides by reacting oleic acid in the vapor phase with ozone and activated oxygen at a pressure in the range between that equal to 1 mm. of mercury and that equal to 760 mm. and at a corresponding temperature in the range between 176.5° C. and 360° C., condensing the gases resulting from said such reaction, recycling the oxygen contained in such gases, hydrolyzing the ozonides contained in the condensate to form a solution from which both azelaic acid and pelargonic acid are derived, and recycling the unreacted oleic acid.

17. A method of producing oleic ozonides by reacting oleic acid in the vapor phase with ozone at a pressure in the range between that equal to 1 mm. of mercury and that equal to 760 mm. and at a corresponding temperature in the range between 176.5° C. and 360° C., condensing the gases resulting from said such reaction, hydrolizing the ozonides contained in the condensate to form a solution from which both azelaic acid and pelargonic acid are derived, and recycling the unreacted oleic acid.

18. A method of producing oleic ozonides by reacting oleic acid in the vapor phase with ozone in at least the ratio of 5.88 units to 1 unit at a pressure in the range between that equal to about 10 mm. of mercury and about 150 mm. of mercury and at a corresponding temperature in the range between about 223° C. and about 300° C.

19. A method of producing ozonides of oleic acid by reacting oleic acid with ozone in the vapor phase, such reaction being produced by heating oleic acid to the temperature necessary to cause it to subsequently vaporize in the presence of ozone and then introducing the same and said ozone into an area of subatmospheric pressure.

20. A method of producing ozonides of unsaturated fatty acids of from 10 to 24 carbons in chain length by reacting such acids in the vapor phase with ozone, said reaction being produced by heating such acids to the temperature necessary to cause them to subsequently vaporize in the presence of ozone and then introducing the same and said ozone into an area of subatmospheric pressure.

References Cited in the file of this patent

FOREIGN PATENTS

| 565,158 | Germany | Mar. 20, 1931 |
| 165,032 | Australia | Sept. 22, 1955 |

OTHER REFERENCES

Spencer et al.: J. Org. Chem. 5, 610–617 (1940).